April 18, 1933.  D. STENHOUSE  1,904,754
GLASS FEEDER
Filed April 25, 1930
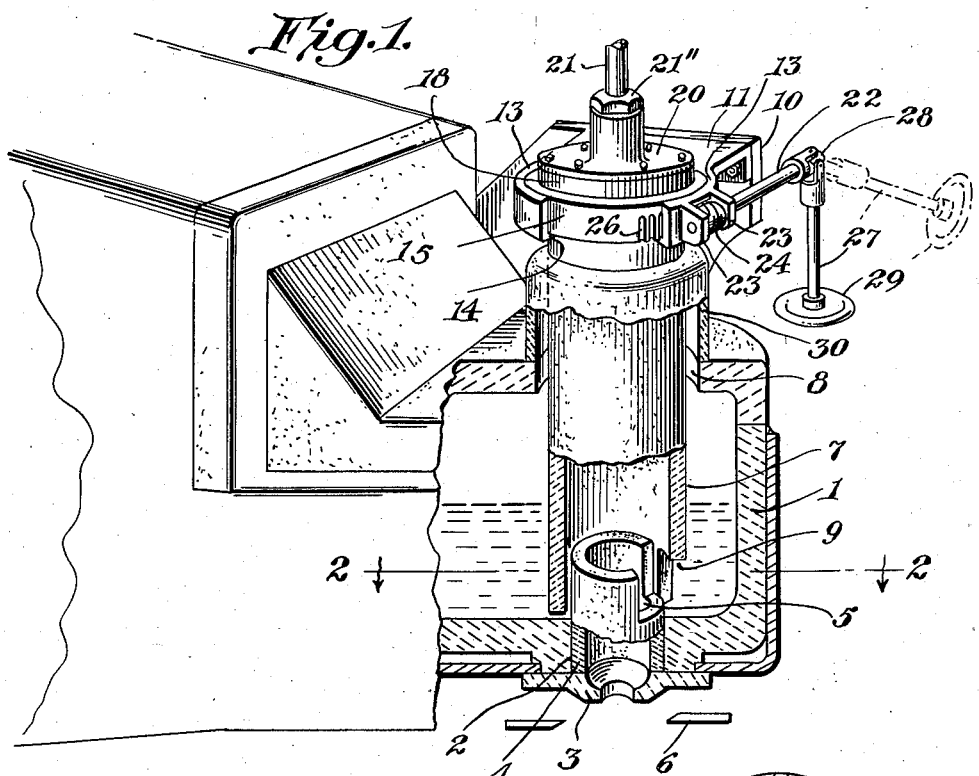
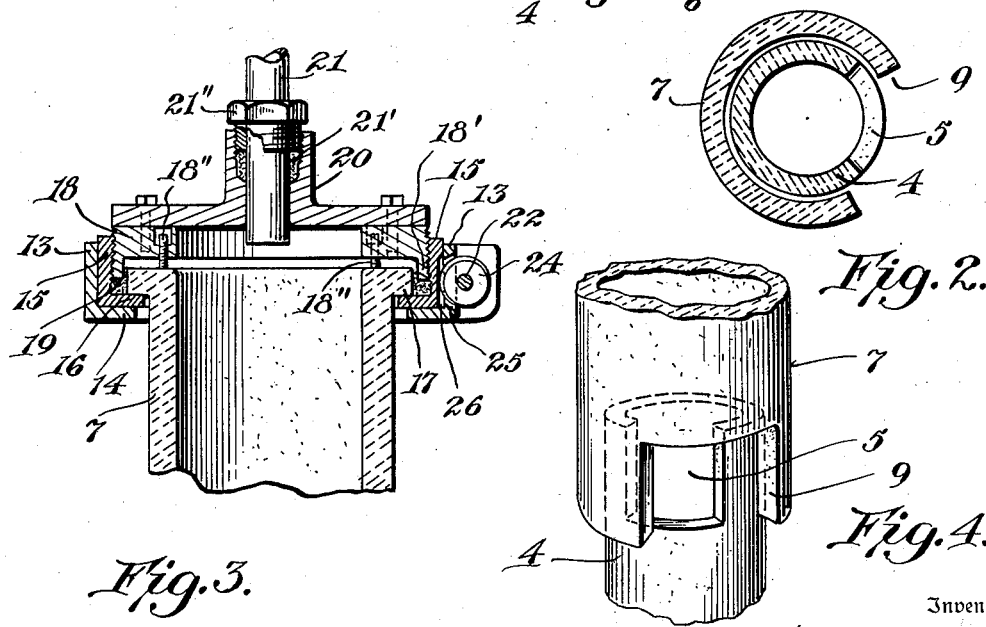
Inventor
David Stenhouse
By Eccleston & Eccleston
Attorneys Patented Apr. 18, 1933

1,904,754

UNITED STATES PATENT OFFICE

DAVID STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA

GLASS FEEDER

Application filed April 25, 1930. Serial No. 447,387.

The invention relates to means for feeding glass to molds for the fabrication of glass articles, by alternately increasing and decreasing the air pressure on the glass. Devices of this type have been known for many years, and the objects of the present invention are to generally simplify and otherwise improve the construction and operation of such feeders.

The advantages of the device will be apparent from the following detailed description, when taken in connection with the accompanying drawing; in which Figure 1 is a perspective view of the feeder mounted in place in a conventional flow spout; parts of the feeder being broken away to more clearly show the construction, and a portion of the flow spout being shown in section.

Figure 2 is a horizontal sectional view of the vacuum and pressure tube and its associated throttle bushing, taken on line 2—2 of Figure 1.

Figure 3 is a vertical sectional view of the upper portion of the vacuum and pressure tube, and its operating mechanism; and Figure 4 is a fragmentary perspective view of the vacuum and pressure tube and throttle bushing.

Referring to the drawing more in detail, numeral 1 indicates a conventional flow spout having the usual flow orifice 2 and orifice bushing 3.

Fitted in the flow orifice is a throttle bushing 4, which projects upward into the glass and has a portion of its wall cut away to form an opening 5. The volume flow of the glass, and hence the weight of the charges, is regulated by the relative angular adjustment of the vacuum and pressure tube and this throttle bushing; the charges, after being severed by the shears 6, drop into the molds (not shown).

The pressure and vacuum tube, which is indicated by numeral 7, extends downwardly through an opening 8 in the roof of the flow spout and its lower end projects through the glass to a point adjacent the floor of the flow spout. A portion of the wall of the tube is cut away at the lower end, to form an opening 9.

When the openings 9 and 5 align glass flows therethrough into the interior of the tube, and the volume of glass flowing therein is regulated by rotatably adjusting the extent of alignment of the openings. When there is complete alignment glass flows into the tube at a maximum volume, and the volume is reduced and regulated to the desired amount by rotatably adjusting the vacuum and pressure tube 7. The mechanism by which this tube is mounted, and rotatably adjusted, will now be described.

Numeral 10 indicates a metallic bracket which is attached to some convenient part of the flow spout. Bolted or otherwise secured to this bracket is a holder 12 which has an annular portion 13 provided with an inturned flange 14 at its lower edge. A ring 15, having an inturned flange 16, fits within the annular member 13 and rests upon the flange 14.

The upper end of the tube 7 has an outwardly extending flange 17, which rests upon the inturned flange 16 of ring 15, whereby the tube is supported. Annular member 18, having a depending flange 18', is threaded into the ring 15; the depending flange forcing the packing 19 into place to form an airtight seal between the tube 7 and the ring 15. The flange 17 of the tube is clamped to the flange 16 of the ring 15, by means of clamping screws 18'', which are threaded through the annular member 18, into engagement with the top of the tube. A cap 20 is bolted to the annular member, and a pipe 21 is mounted in the cap, centrally of the tube 7. It is through this pipe that air under pressure is alternately introduced into the tube and withdrawn therefrom, to alternately compress and rarefy the air in the tube, thereby increasing and decreasing the pressure on the glass. An airtight connection between cap 20 and pipe 21 is provided by means of the packing 21' which is forced into place by the nut 21'' which embraces the pipe and is in threaded engagement with the cap.

A shaft 22 is journaled in lugs 23, 23, projecting from the annular portion of the holder; and this shaft carries a worm 24 which projects through an opening 25 in the holder into engagement with teeth 26 formed on the ring 15. By rotating the shaft 22 and its worm 24 the vacuum and pressure tube is rotated in the desired direction to increase or decrease the volume of glass flowing into the tube. For conveniently operating the shaft 22 I provide a shaft 27 connected thereto by a universal joint 28, and having a hand wheel 29.

A hood 30 is fitted about the upper portion of the tube, and extends down to the opening 8 in the roof of the flow spout, by which it is supported.

In operation, air under pressure from any appropriate source, is introduced through the pipe 21 into the tube 7. The pressure on the glass is thereby increased, thus increasing the flow of glass over the normal gravity flow. At the desired instant the pressure through the pipe 21 is shut off, and the pipe is connected with a source of vacuum; the pressure in the tube 7 being thereby reduced to or below normal atmospheric pressure. The reduction of pressure may be such as to retard the flow of glass, or stop the flow, or reverse the direction of flow. The charges are severed at the desired time, and drop into the molds. To change and regulate the weight of these charges, it is only necessary to rotate the tube 7 in the desired direction and to the desired extent, to thereby increase or decrease the degree of alignment of the openings 5 and 9.

It has been deemed unnecessary to illustrate any particular mechanism for controlling the application of pressure and vacuum to the tube, mechanism for operating the shears, etc.; for any desired mechanism may be employed. Mechanism for these purposes are of common knowledge in the glass industry, having been known for many years, and are in common use.

What I claim as new is:

1. A pneumatic glass feeder, including a flow spout having a flow orifice, a rotatably adjustable vacuum and pressure tube projecting into the flow spout in alignment with the flow orifice, and means associated with the lower portion of the tube to vary the volume of glass flowing through the flow orifice as the tube is rotatably adjusted.

2. A pneumatic glass feeder, including a flow spout having a flow orifice, a vacuum and pressure tube projecting into the flow spout in alignment with the flow orifice, said tube being rotatably adjustable, means associated with the lower portion of the tube to regulate the volume of glass flowing through the flow orifice as the tube is rotatably adjusted, and means for rotatably adjusting the tube.

3. A pneumatic glass feeder, including a flow spout having a flow orifice, a throttle bushing arranged in said orifice and projecting upwardly into the glass, a vacuum and pressure tube projecting downwardly into the flow spout and embracing said throttle bushing, said tube and bushing being relatively adjustable rotatably, to regulate the volume of glass flowing through the flow orifice.

4. A pneumatic glass feeder, including a flow spout having a flow orifice, a throttle bushing arranged in said orifice and projecting upwardly into the glass, the throttle bushing having an opening in its side to permit the glass to flow into the interior thereof, a vacuum and pressure tube projecting downwardly into the glass and embracing the throttle bushing, the tube and bushing being rotatably adjustable relatively, to regulate the volume of glass flowing through the flow orifice.

5. A pneumatic glass feeder, including a flow spout having a flow orifice, a throttle bushing arranged in said orifice and projecting upwardly into the glass, the throttle bushing having an opening in its side to permit the glass to flow into the interior thereof, a vacuum and pressure tube projecting downwardly into the glass and embracing the throttle bushing, said tube having an opening in its side adapted to rotatably align more or less with the opening in the side of the throttle bushing, and means to rotatably adjust the tube to regulate the degree of alignment between the two openings.

6. A pneumatic glass feeder, including a flow spout having a flow orifice, a vacuum and pressure tube projecting downwardly into the glass in alignment with the flow orifice, a flange formed on the upper end of the tube, a ring in which said flange is mounted, means for clamping together the ring and flange, teeth formed on the exterior of the ring, means engaging the teeth to rotatably adjust the tube, and means associated with the lower portion of the tube to regulate the volume of glass flowing through the flow orifice as the tube is rotatably adjusted.

7. A pneumatic glass feeder, including a flow spout having a flow orifice, a vacuum and pressure tube projecting downwardly into the glass in alignment with the flow orifice, a flange formed on the upper end of the tube, a ring in which said flange is mounted, means for clamping together the ring and flange, teeth formed on the exterior of the ring, means engaging the teeth to rotatably adjust the tube, throttling means associated with the lower end of the tube, said throttling means provided with a lateral opening, the lower end of the tube provided with a lateral opening, the two lateral openings being caused to register to the desired degree by said adjustment of the tube.

8. A pneumatic glass feeder, including a flow spout having a flow orifice, a vacuum and pressure tube projecting downwardly into the glass in alignment with the flow orifice, means for rotatably adjusting said tube, the lower portion of said tube provided with a lateral opening, and means associated with said opening to vary the effective size thereof when the tube is rotatably adjusted.

9. A pneumatic glass feeder, including a flow spout having a flow orifice, a vacuum and pressure tube projecting downwardly into the glass in alignment with the flow orifice, the lower portion of said tube provided with a lateral opening, an arcuate bushing or wall associated with the lower portion of the tube, said arcuate bushing or wall having a lateral opening, and means to relatively adjust the tube and bushing to vary the degree to which said openings register.

DAVID STENHOUSE.